(12) United States Patent
Yoshikawa et al.

(10) Patent No.: US 12,221,532 B2
(45) Date of Patent: Feb. 11, 2025

(54) PROPYLENE-BASED RESIN COMPOSITION AND FILM FOR HEAT SEALING

(71) Applicant: TOYO SEIKAN GROUP HOLDINGS, LTD., Tokyo (JP)

(72) Inventors: Seishi Yoshikawa, Yokohama (JP); Koki Shibata, Yokohama (JP); Atsushi Ebata, Yokohama (JP); Takayuki Ishihara, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 570 days.

(21) Appl. No.: 17/763,946

(22) PCT Filed: Sep. 3, 2020

(86) PCT No.: PCT/JP2020/033378
§ 371 (c)(1),
(2) Date: Mar. 25, 2022

(87) PCT Pub. No.: WO2021/059913
PCT Pub. Date: Apr. 1, 2021

(65) Prior Publication Data
US 2022/0332930 A1  Oct. 20, 2022

(30) Foreign Application Priority Data

Sep. 26, 2019 (JP) ................. 2019-175237

(51) Int. Cl.
*C08L 23/12* (2006.01)
*C08L 23/06* (2006.01)
*C08L 23/16* (2006.01)

(52) U.S. Cl.
CPC ............... *C08L 23/12* (2013.01); *C08L 23/06* (2013.01); *C08L 23/16* (2013.01);
(Continued)

(58) Field of Classification Search
CPC .......... C08L 23/16; C08L 23/12; C08L 23/06; C08L 2207/02; C08L 2203/16; C08L 2203/162
See application file for complete search history.

(56) References Cited

U.S. PATENT DOCUMENTS 5,331,047 A * 7/1994 Giacobbe ................ C08L 23/10
525/88
8,779,064 B2 * 7/2014 Kim .......................... C08J 5/18
525/240

(Continued)

FOREIGN PATENT DOCUMENTS

EP 1801156 A1 * 6/2007 ............ C08F 210/06
JP 59-49249 A 3/1984
(Continued)

OTHER PUBLICATIONS

Office Action issued Sep. 1, 2023 in corresponding Chinese Application No. 202080067334.4.
(Continued)

Primary Examiner — Rip A Lee
(74) Attorney, Agent, or Firm — Sughrue Mion, PLLC

(57) ABSTRACT

A propylene-based resin composition including an impact polypropylene component (A), and a linear low-density polyethylene component (B) containing methylpentene as a comonomer, the composition being characterized by containing a xylene-soluble fraction in an amount of 8 mass % or higher, and having an intrinsic viscosity measured for the xylene-soluble fraction is in a range from 1.0 to 2.9 dL/g.

8 Claims, 1 Drawing Sheet

(52) U.S. Cl.
CPC ..... *C08L 2203/162* (2013.01); *C08L 2207/02* (2013.01); *C08L 2207/064* (2013.01)

(56) References Cited

U.S. PATENT DOCUMENTS

| | | | |
|---|---|---|---|
| 10,385,199 B2* | 8/2019 | Cavalieri | C08L 23/16 |
| 10,654,999 B2* | 5/2020 | Galvan | C08L 23/10 |
| 10,800,209 B2* | 10/2020 | Sone | B60C 1/0008 |
| 11,292,900 B2* | 4/2022 | Gahleitner | C08L 23/12 |
| 2009/0258243 A1 | 10/2009 | Maruyama et al. | |
| 2017/0305127 A1 | 10/2017 | Yanagishita et al. | |
| 2019/0193904 A1* | 6/2019 | Toyoshima | C08L 23/04 |

FOREIGN PATENT DOCUMENTS

| | | |
|---|---|---|
| JP | 10-749 A | 1/1998 |
| JP | 2011-037454 A | 2/2011 |
| JP | 4844091 B2 | 12/2011 |
| JP | 2015-10104 A | 1/2015 |
| JP | 2015-113124 A | 6/2015 |
| JP | 2016-74900 A | 5/2016 |
| JP | 2021055050 A * | 4/2021 |
| WO | 2007/046307 A1 | 4/2007 |
| WO | 2007/113124 A1 | 10/2007 |
| WO | 2017/038349 A1 | 3/2017 |
| WO | 2019/189486 A1 | 10/2019 |

OTHER PUBLICATIONS

International Search Report for PCT/JP2020/033378 dated Nov. 17, 2020 [PCT/ISA/210].

Communication dated Apr. 12, 2023, issued in Japanese Application No. 2019-175237.

* cited by examiner

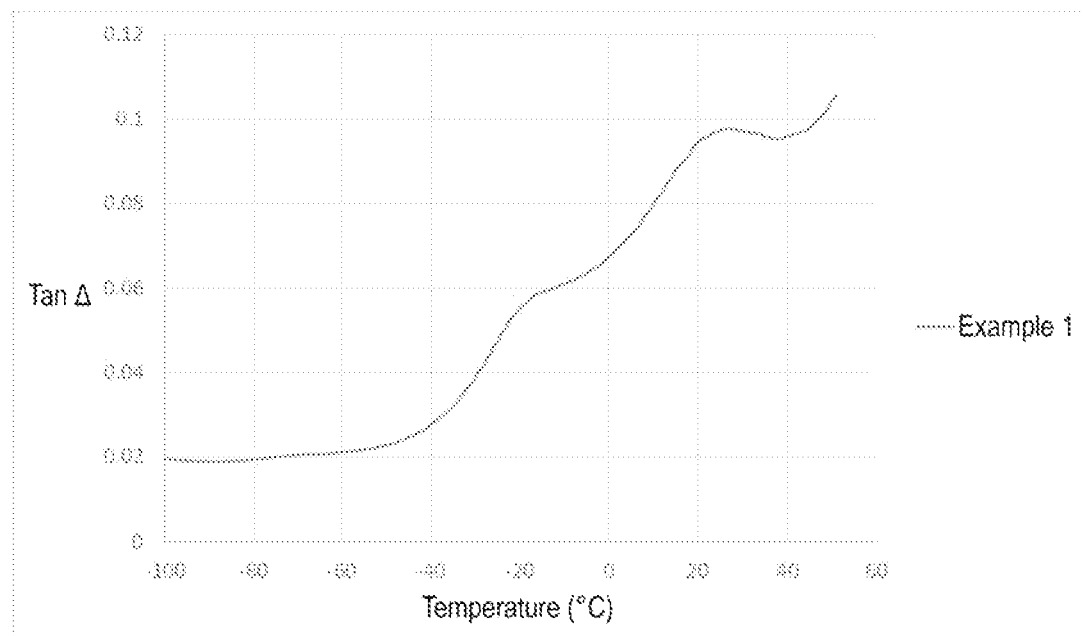

PROPYLENE-BASED RESIN COMPOSITION AND FILM FOR HEAT SEALING

CROSS REFERENCE TO RELATED APPLICATIONS

This application is a National Stage of International Application No. PCT/JP2020/033378 filed Sep. 3, 2020, claiming priority based on Japanese Patent Application No. 2019-175237 filed Sep. 26, 2019.

TECHNICAL FIELD

The present invention relates to a propylene-based resin composition containing an impact polypropylene and further relates to a film for heat sealing, including the propylene-based resin composition.

BACKGROUND ART

Cast polypropylene (CPP) films (also referred to as unoriented polypropylene films or cast PP films) including a polypropylene and having heat sealability are excellent in heat resistance and used for producing pouches for containing food of various types. Meanwhile, more heat resistance and impact resistance are required for retort sterilization (heat steam sterilization) in recent years, and thus impact polypropylenes (which may be hereinafter referred to as "impact PPs") have been used for producing CPP films.

Impact PPs, also referred to as block PPs, impact copolymers, or high-impact polypropylenes, are products in which a rubber component, such as an ethylene-propylene copolymer (EPR) or a styrene-butadiene copolymer (SBR), is dispersed in a matrix of a homo-polypropylene or a random polypropylene and has remarkably improved impact resistance strength due to the dispersion of such a rubber component.

On the other hand, CPP films used for producing pouches supplied for retort sterilization or the like are also required to have blocking resistance and orange peel resistance in addition to heat seal strength and impact resistance properties. That is, in addition to the need for blocking resistance to prevent blocking when the films are stacked on each other, when the films are subjected to heat steam sterilization such as retort sterilization, oil components in the content may permeate the films, causing the pouch to deform to present orange peel-like appearance. Thus, the prevention of such deformation to the orange peel-like appearance is also required. The films formed from the impact PP described above have poor blocking resistance and poor orange peel resistance and thus need further improvement.

Various measures to improve the properties described above have been proposed. For example, Patent Documents 1 and 2 propose (poly)propylene-based resin compositions in which a linear low-density polyethylene (LLDPE) is blended to a (poly)propylene-based impact copolymer (corresponding to an impact PP) and disclose that such resin compositions provide films for heat sealing excellent in various properties.

In Patent Documents 1 and 2, a linear low-density polyethylene is blended into an impact PP in an attempt to improve the physical properties of the film for heat sealing including the impact PP, but further improvement is necessary in terms of impact resistance at low temperatures. That is, the case needs to be considered for storage of pouches filled with various foods in cold climate areas, and impact resistance at a low temperature of approximately 5° C. is required. However, the impact resistance at such a low temperature is still insufficient; in reality, when a pouch produced using this film is filled with a content, stored in that state at a temperature of 5° C., and then subjected to a drop test from a height of 120 cm, the pouch would rapture with a considerable probability, for example. In Patent Document 2, impact resistance is evaluated by a drop test at 0° C. but with a drop height as low as 55 cm; impact resistance at low temperatures cannot be said to be sufficient.

CITATION LIST

Patent Literature

Patent Document 1: JP 4844091 B
Patent Document 2: WO 2017/038349

SUMMARY OF INVENTION

Technical Problem

Thus, an object of the present invention is to provide a propylene-based resin composition capable of producing a film for heat sealing with improved impact resistance at low temperatures, and a film for heat sealing obtained from the composition.

Solution to Problem

An embodiment of the present invention provides a propylene-based resin composition including:
  an impact polypropylene component (A), and
  a linear low-density polyethylene component (B) containing methylpentene as a comonomer,
  the composition being characterized by containing a xylene-soluble fraction in an amount of 8 mass % or higher, and having an intrinsic viscosity measured for the xylene-soluble fraction in a range from 1.0 to 2.9 dL/g.

In the propylene-based resin composition according to an embodiment of the present invention, it is preferable that:
  (1) the impact polypropylene component (A) has the xylene-soluble fraction percentage in a range from 8 to 20 mass %,
  (2) a mass ratio (A)/(B) of the impact polypropylene component (A) to the linear low-density polyethylene component (B) is in a range from 95/5 to 80/20, and
  (3) the xylene-soluble fraction is an ethylene-propylene copolymer.

An embodiment of the present invention also provides a film for heat sealing, including the propylene-based resin composition described above.

In such a film for heat sealing (heat sealing film), it is desirable that:
  (4) a value of tan δ (5° C., 10 Hz) measured by a dynamic viscoelasticity test is in a range of 0.070 or greater, and a glass transition temperature derived from an ethylene-propylene copolymer in the impact polypropylene component (A) calculated from a tan δ-temperature curve obtained by the dynamic viscoelasticity test is higher than −35° C.

Such a film for heat sealing (heat sealing film) is laminated as a heat-sealing layer with another resin or a metal foil and used as a multilayer film, particularly a multilayer film for a pouch.

That is, an embodiment of the present invention further provides a pouch formed from the multilayer film described above.

In an embodiment of the present invention, the xylene-soluble fraction percentage in the CPP film is measured, as described in Examples below, by dissolving the CPP film (which may be hereinafter referred to as the "impact PP") in boiling xylene, cooling to separate solid and liquid, reprecipitating this soluble fraction with ethanol, filtering and drying the precipitate, and weighing the dried precipitate. That is, this xylene-soluble fraction percentage corresponds to the ethylene-propylene copolymer amount in the impact polypropylene and can also be measured after the film formation. That is, when the xylene-soluble fraction percentage is measured in the form of a film, the xylene-insoluble fraction amount corresponds to the rest of the components (the polypropylene and the linear low-density polyethylene used as a modifying component).

In addition, the intrinsic viscosity of the xylene-soluble fraction (i.e., the ethylene-propylene copolymer in the impact PP) is measured using tetralin at 135° C. as a solvent.

Furthermore, the glass transition temperature derived from the ethylene-propylene copolymer in the impact PP component (A) in the film is determined as a maximum point in the low temperature side of a change curve of tan δ to temperature at 10 Hz (tan δ-temperature curve) prepared in dynamic viscoelasticity measurement (DMA).

Advantageous Effects of Invention

The propylene-based resin composition according to an embodiment of the present invention described above contains:
  the impact polypropylene (impact PP) with the xylene-soluble fraction percentage and the intrinsic viscosity of the xylene-soluble fraction in predetermined ranges, and
  the specific LLDPE containing methylpentene (4-methylpentene-1) as a comonomer, and
  is effectively used for producing the film for heat sealing.

That is, in the film for heat sealing that is obtained by melt-extruding this propylene-based resin composition, the tan δ at 5° C. and 10 Hz measured by a dynamic viscoelasticity test of the film can be set at 0.070 or greater, and the glass transition temperature of the ethylene-propylene copolymer calculated from a tan δ-temperature curve obtained by the dynamic viscoelasticity test can be set to be higher than −35° C. As a result, this film for heat sealing is excellent not only in orange peel resistance, blocking resistance, and heat resistance, but also in impact resistance at low temperatures, and the pouch formed using this film for heat sealing has extremely high drop impact resistance at low temperatures; this can effectively avoid the breakage of the pouch when this pouch is filled with a content, kept at 5° C., and then dropped from a height of 120 cm.

A great advantage of such an embodiment of the present invention resides in that once the amount and intrinsic viscosity of the ethylene-propylene copolymer contained in the impact PP, which are readily measurable parameters also in the form of a film, are set in certain ranges, this eliminates the need to make an effort in producing an impact PP with physical properties difficult to measure, such as an ethylene/propylene ratio and the polymerization degree of the copolymer component, in certain ranges, and can greatly improve impact resistance of the film at low temperatures by adjusting physical properties by combining the specific low-density polyethylene (LLDPE) to a combination of impact PPs already commercially available. In other words, an embodiment of the present invention can be easily implemented also by a non-polymer manufacturer and is industrially extremely useful.

BRIEF DESCRIPTION OF DRAWINGS

The FIGURE is a diagram showing a tan δ-temperature curve obtained by dynamic viscoelasticity measurement of a film for heat sealing according to an embodiment of the present invention obtained in Example 1.

DESCRIPTION OF EMBODIMENTS

Propylene-Based Resin Composition

A propylene-based resin composition according to an embodiment of the present invention contains an impact polypropylene component (A) and a linear low-density polyethylene component (B) as essential components.

Impact PP Component (A);

The impact polypropylene (impact PP) used in an embodiment of the present invention has a structure in which an ethylene-propylene copolymer (EPR) is dispersed especially in a homo- or random polypropylene. That is, the dispersion of the EPR in the polypropylene imparts impact resistance to the polypropylene. A known rubber component dispersed in the polypropylene includes, in addition to the EPR, an ethylene-propylene-butene copolymer and a styrene-butadiene copolymer (SBR), which can improve impact resistance at low temperatures.

In an embodiment of the present invention, the impact PP as described above has a melt flow rate (MFR, 230° C.) in a range approximately of 0.5 to 10 g/10 min from the viewpoint, such as film formability (extrusion formability).

In addition, the CPP film used in an embodiment of the present invention needs to have a xylene-soluble fraction percentage of 8 mass % or higher. That is, this xylene-soluble fraction percentage is a component extracted from the impact PP by boiling xylene as previously described and corresponds to the content of the ethylene-propylene copolymer (EPR) in the impact PP. With this xylene-soluble content being low, setting the value of tan δ (5° C., 10 Hz) measured by a dynamic viscoelasticity test of the resulting film to a predetermined value (0.070) or higher would be difficult, resulting in unsatisfactory impact resistance at low temperatures. Furthermore, with this xylene-soluble fraction percentage (EPR percentage) being higher than necessary, orange peel resistance and blocking resistance may be impaired, and thus this xylene-soluble fraction percentage is preferably in a range of 20 mass % or lower.

Moreover, in an embodiment of the present invention, the intrinsic viscosity of the xylene-soluble fraction (EPR) needs to be in a range from 1.0 to 2.9 dL/g and particularly preferably from 1.5 to 2.9 dL/g. That is, this intrinsic viscosity is a parameter corresponding to the molecular weight of the EPR in the impact PP. With this value being out of the above range, hygiene and formability would be unsatisfactory.

In an embodiment of the present invention, the xylene-soluble fraction percentage and the intrinsic viscosity of the xylene-soluble fraction can be adjusted by blending different impact PPs, and as described above, this is a great advantage of an embodiment of the present invention.

For example, also for the impact PP having high EPR content and showing a greater value of the xylene-soluble fraction percentage than the range described above, the xylene-soluble fraction percentage can be adjusted to the range described above by combining the impact PP with an impact PP with low EPR content and small xylene-soluble fraction percentage. The same also applies to the intrinsic viscosity of the xylene-soluble fraction of these. That is, also for the impact PP having an EPR with a large molecular weight and showing a greater value of the xylene-soluble fraction percentage than the range described above, the intrinsic viscosity can be adjusted to the range described above by combining the impact PP with an impact PP with an EPR with a small molecular weight and a small intrinsic viscosity.

Linear Low-Density Polyethylene Component (B);

In an embodiment of the present invention, the linear low-density polyethylene (LLDPE) component (B) is used in addition to the impact PP component (A) described above. That is, when mixed with the impact PP described above, this LLDPE functions as a compatibilizer between the polypropylene (PP) and the ethylene-propylene copolymer (EPR); finely dispersing the EPR in the PP and allowing the EPR to sufficiently exhibit its impact improving effect; and this can improve the impact resistance at low temperatures.

This LLDPE is a linear low-density polyethylene with a density from 0.910 to 0.925 g/cm$^3$, and the LLDPE used in an embodiment of the present invention is produced using methylpentene (4-methylpentene-1) as a comonomer component. That is, the LLDPE is formed by copolymerizing a trace amount (approximately several %) of an α-olefin with ethylene and introducing a short α-olefin chain as a branch into a long ethylene chain to reduce the density. The LLDPE has extremely high molecular linearity. For the α-olefin used as a comonomer, butene-1, hexene-1, and the like are known in addition to methylpentene, but methylpentene is more effective. Although the reason for this is not clear, this is probably because the impact PP with the xylene-soluble fraction percentage (EPR content) and the intrinsic viscosity of the xylene-soluble fraction (intrinsic viscosity of the EPR) in certain ranges is used in an embodiment of the present invention, and the LLDPE copolymerized with 4-methylpentene-1 works most effectively as a compatibilizer on the impact PP having such physical properties.

In an embodiment of the present invention, such an LLDPE with an MFR (190° C.) from 1.0 to 15 g/10 min is suitably used from the viewpoint of film formability.

In addition, in an embodiment of the present invention, the LLDPE contains methylpentene used as a comonomer preferably in an amount of 10 mol % or lower and has a number average molecular weight preferably of 10000 or greater measured by GPC calibrated with polystyrene. That is, when the content of methylpentene used as a comonomer is large, or when the number average molecular weight is small, and a large amount of low molecular weight component is contained, blocking of the CPP film would be concerned. In addition, this LLDPE may partially dissolve in xylene, and this would make it difficult to measure the xylene-soluble fraction percentage in the formed film and make the quality control troublesome. That is, when the suitable LLDPE as described above is used, the xylene-soluble fraction percentage (i.e., the EPR content in the impact PP) and further the intrinsic viscosity of the xylene-soluble fraction can be measured in the state of the film, and whether the film is formed in the formulation as designed can be easily confirmed.

In the propylene-based resin composition containing such impact PP component (A) and LLDPE component (B), a mass ratio (A)/(B) of the impact PP component (A) to the LLDPE component (B) is preferably in a range from 95/5 to 80/20. That is, when this mass ratio is greater than the above range, the EPR content in the impact PP occupying the composition would be excessively large; this may reduce the orange peel resistance and blocking resistance and may also lessen the modification effect by the LLDPE and thus reduce the impact resistance at low temperatures. Furthermore, when the mass ratio (A)/(B) is smaller than the above range, the effect of the heat resistance improvement by the use of the impact PP would be reduced. For example, when a pouch is formed using a film formed from this composition, the pouch would be likely to break after heat treatment, such as retort sterilization.

In addition, in the propylene-based resin composition according to an embodiment of the present invention, a small amount of a known additive, such as, an antioxidant, can be blended in addition to the impact PP component (A) and the LLDPE component (B) described above as long as film physical properties described later are not affected.

Heat Sealing Film

A film for heat sealing according to an embodiment of the present invention (which may be hereinafter referred to as the "CPP film") is obtained by melt extrusion using a blend of the impact PP component (A) and the modifying component (B) (i.e., the linear low-density polyethylene), but this film needs to have the following physical properties:
 (i) The tan δ (5° C., 10 Hz) measured by a dynamic viscoelasticity test is 0.070 or greater, especially 0.072 or greater, and
 (ii) The glass transition temperature derived from the ethylene-propylene copolymer in the impact PP, the glass transition temperature being calculated from a tan δ-temperature curve obtained by the dynamic viscoelasticity test, is higher than −35° C., especially −30° C. or higher.

First, to explain the property (i) above, the tan δ (loss tangent) is a temperature-dependent parameter expressed as a loss elastic modulus/storage elastic modulus ratio; the higher the value, the greater the property as a viscous material, and the lower the value, the greater the property as an elastic material. In an embodiment of the present invention, viscoelasticity is measured using a dynamic viscoelasticity measuring device under conditions where stress is applied to the film at 10 Hz, and a temperature change curve of tan δ is prepared; the tan δ at 5° C. needs to be in the above range, that is, 0.070 or greater, especially 0.072 or greater to obtain good low-temperature impact resistance. The CPP film according to an embodiment of the present invention shows a relatively large value of tan δ at 5° C. and thus can improve the impact resistance at low temperatures.

The value of tan δ at 5° C. varies also with the impact PP used but tends to depend mainly on the EPR content and the blending amount of the LLDPE in the impact PP. For example, when an impact PP with high EPR content is used, the tan δ tends to show a high value, and when an impact PP with low EPR content is used, the tan δ tends to show a small value. Thus, in the propylene-based resin composition described above, the impact PP with certain values or higher of the xylene-soluble fraction percentage (i.e., the EPR content) and blending amount of the LLDPE is used.

The EPR content (xylene-soluble fraction percentage) described above is also measured by dissolving the CPP film in boiling xylene. The EPR content (xylene-soluble fraction percentage) in the CPP film greatly contributes to the improved impact resistance, but when this amount is excessively higher than necessary, the blocking resistance and orange peel resistance of the film would be impaired, and in addition, heat seal strength may decrease. Thus, in the CPP according to an embodiment of the present invention, this xylene-soluble fraction percentage is preferably reduced to 20 mass % or lower by adjusting the blending amount of the LLDPE described above.

Furthermore, the above glass transition temperature (ii) is derived from the EPR in the impact PP and is calculated from a tan δ-temperature curve measured by the dynamic viscoelasticity test described above.

The FIGURE is a tan δ-temperature curve of the CPP film according to an embodiment of the present invention produced in Example 1 described later. To explain using this as a model diagram, the glass transition temperature is a temperature representing the maximum point of this curve. As can be understood from the FIGURE, there are two maximum points in the CPP film according to an embodiment of the present invention, and the maximum point at 0° C. or higher is derived from polypropylene in the impact PP. The position of this maximum point may be slightly shifted to the low temperature side by compatibilization with the LLDPE but is almost constant regardless of the type of impact PP used. On the other hand, the maximum point occurring on the negative temperature side is derived from the EPR in the impact PP. That is, in an embodiment of the present invention, to improve the impact resistance at low temperatures, in addition to the property (i) described above, the glass transition temperature derived from this EPR is higher than −35° C. and particularly preferably in a range of −30° C. or higher, and this greatly improves the impact resistance at low temperatures.

In an embodiment of the present invention, the CPP film is formed using the propylene-based resin composition containing the impact PP and the LLDPE described above, and thus this can satisfy the tan δ and the glass transition temperature as described above.

The CPP film described above is produced by dry-blending the impact PP and the LLDPE in a predetermined amount ratio to prepare the propylene-based resin composition described above; feeding this composition to an extruder to melt-knead the composition; melt-extruding the blend into a film shape from a T-die; and bringing the extruded film-shaped melt into contact with a cooling roll to solidify the melt and a solidified film is wound. However, depending on the cooling conditions and the winding speed at this time, various values measured by the dynamic viscoelasticity test may not be stable. That is, in an embodiment of the present invention, predetermined tan δ and glass transition temperature should be measured by a laboratory test in advance, and the cooling temperature and the winding speed of the film should be determined. For example, in an embodiment of the present invention, the temperature of the cooling roll was set at 60° C. or lower.

In addition, the thickness of the CPP film described above is not particularly limited but typically is in a range from 20 to 100 μm and, in particular, preferably from 50 to 80 μm in consideration of the impact resistance, heat sealability, and the like.

The CPP film (film for heat sealing) described above is typically laminated with another film and used for producing packaging bags as a multilayer film.

In such a multilayer film, the CPP film described above is provided on one surface side of the multilayer film as a heat-sealing layer. In addition, another film to be laminated can be exemplified by oriented polypropylene films; oriented nylon films; oriented polyester films; metal foils, such as aluminum foils. In the lamination, a dry laminate adhesive, such as a urethane-based or epoxy-based adhesive, can be appropriately used, or a printed layer can be interposed between the layers. Furthermore, surface treatment, such as corona treatment, flame treatment, or plasma treatment, can be performed to improve the adhesion of the film.

The multilayer film thus obtained is excellent not only in the heat resistance, orange peel resistance, blocking resistance, and the like but also in the impact resistance at low temperatures. Thus, the multilayer film is suitably applied to producing packaging bags (pouches) for food, the packaging bags subjected to sterilization treatment, such as retort sterilization, and also low-temperature storage in cold climate areas.

EXAMPLES

The excellent effects of an embodiment of the present invention will be described in the following examples.

The following materials were used in the experiments below.

Impact PP Component (A)
Block PP (a1);
  PC480A available from SunAllomer Ltd.
  MFR (230° C.): 2.0 g/10 min
  EPR content: 17.5 mass %
  Intrinsic viscosity of EPR: 2.19 dL/g
Block PP (a2);
  FC330R available from Lotte Chemical Corporation
  MFR (230° C.): 3.0 g/10 min
  EPR content: 7.5 mass %
  Intrinsic viscosity of EPR: 1.78 dL/g
Block PP (a3);
  FH3011 available from Sumitomo Chemical Co., Ltd.
  MFR (230° C.): 2.3 g/10 min
  EPR content: 6.4 mass %
  Intrinsic viscosity of EPR: 0.56 dL/g
LLDPE (B)
LLDPE (b1);
  (Sumikathene) FV205 available from Sumitomo Chemical Co., Ltd.
  MFR (190° C.): 2.2 g/10 min
  Density: 921 kg/m$^3$
  α-Olefin species: hexane-1
LLDPE (b2);
  ULTZEX 2022L available from Prime Polymer Co., Ltd.
  MFR (190° C.): 2.0 g/10 min
  Density: 919 kg/m$^3$
  α-Olefin species: 4-methylpentene-1

Various measurements and formation of a CPP film were performed by the following methods.
EPP Content (Xylene-Soluble Fraction Percentage)

The impact PP or CPP film was reflux-dissolved in xylene, the solution was allowed to cool and then separated into solid and liquid.

The xylene-soluble fraction was reprecipitated with methanol, the precipitate was taken out by filtration, dried, weighed, and the EPR content was calculated.
Intrinsic Viscosity of EPR The intrinsic viscosity was measured using an Ubbelohde viscometer with a tetralin solvent at 135° C.
Formation of CPP Film Each composition was dry-blended and fed into a hopper of a single-screw extruder with a T-die. The blend was melt-kneaded in the extruder, the melt was discharged in a film shape from the T-die and brought into contact with a cooling roll to solidify and a solidified film was wound, and the film with a thickness of 70 μm was formed.

The temperature settings of cylinders of the extruder cylinder are as follows:
C1: 150° C.
C2: 200° C.
C3: 210° C.
C4: 220° C.
T-die temperature: 220° C.

The resulting CPP film was treated by corona discharge, and the surface was hydrophilized.

Dynamic Viscoelasticity Measurement

The dynamic viscoelasticity was measured using a dynamic viscoelasticity measuring device available from Seiko Instruments Inc. The test conditions are as follows:
Test specimen film: length of 20 mm long and width of 10 mm
Inter-chuck distance: 5 mm
Temperature range: −60° C. to 60° C.
Temperature increase rate: 3° C./min
Frequency: 10 Hz
Tan δ (loss tangent): Determined as a loss elastic modulus/a storage elastic modulus at 5° C.

Glass Transition Temperature of EPR

The dynamic viscoelasticity was measured for the produced CPP film, and the glass transition temperature was determined at the maximum point of tan δ observed in the negative region.

Laminate

A laminate with the layer configuration of an oriented PET (thickness 12 μm)/an oriented nylon (thickness 15 μm)/an aluminum foil (thickness 7 μm)/the CPP (thickness 70 μm) was produced by a dry lamination method using a urethane adhesive.

Formation of Pouch

A film in which the CPP film was laminated was cut into two pieces of 140 mm×180 mm, filled with 200 g of water, and formed into a pouch. An Impulse Sealer available from Fuji Impulse Co., Ltd. was used to form the pouch.
Sealing conditions: 220° C., 1.4 (s), and cooling 3.0 (s)
Seal width: 5 mm Retort Conditions 121° C., 30-min shower Pouch Drop Test The pouches were cooled overnight in a 5° C. environment, and two pouches in a horizontal position were stacked and dropped from a height of 120 cm and measured. The lower pouch was used as a test pouch. The pouches were dropped 20 times, and the number of times where the lower pouch was unbroken was counted. This test was performed three times, and the average in three tests was determined.

Orange Peel Resistance

The pouch was filled with shrimp in chili sauce, the surface of the pouch after retort sterilization was visually observed, and the orange peel resistance was evaluated according to the criteria below.

The laminate pouch produced by the procedure described above was filled with 130 g of Cook Do Sauce for Braised Shrimp in Chili Sauce, combined seasoning for Chinese cooking, available from Ajinomoto Co., Inc. as content, the surface of the pouch after retort sterilization was visually observed, and the orange peel resistance was evaluated according to the criteria below.
Good: The appearance change of the pouch surface was small.
Poor: The pouch surface greatly changed to the orange peel-like appearance.

Example 1

A CPP film was formed with a weight ratio of the block PP (a1)/the LLDPE (b2) of 80/20. In this film formation, the cooling roll was set at 60° C. with a winding speed from 2.0 to 3.0 m/min.

This CPP film was measured for the xylene-soluble fraction (EPR content), and the dynamic viscoelasticity was measured to determine tan δ at 5° C., and in addition, the glass transition temperature of the EPR in the impact PP was calculated from the maximum point of the tan δ observed in the negative region. The temperature curve of the tan δ obtained by this measurement is shown in the FIGURE.

The CPP film described above was laminated and then formed into a pouch. The pouch was subjected to retort treatment, and a bag drop test was performed.

Each measurement result and the like are shown in Table 1.

In addition, the orange peel resistance of this pouch was evaluated good.

Example 2

A CPP film was produced in the same manner as in Example 1 except that the amount ratio of the block PP (a1) to the LLDPE (b2) was changed to 90/10, and the various measurements and the bag drop test were performed in the same manner as in Example 1. The results are shown in Table 1.

In addition, the orange peel resistance of this pouch was evaluated good.

Example 3

A CPP film was produced in the same manner as in Example 1 except that the amount ratio of the block PP (a1) to the LLDPE (b2) was changed to 95/5, and the various measurements and the bag drop test were performed in the same manner as in Example 1. The results are shown in Table 1.

Example 4

A CPP film was produced in the same manner as in Example 1 except that the weight ratio, the block PP (a2)/the block PP (a1)/the LLDPE (b2), was 65/15/20 and the temperature of the cooling roll was changed to 45° C., and the various measurements and the bag drop test were performed in the same manner as in Example 1. The results are shown in Table 1. In this example, the film was dissolved in boiling xylene to extract the xylene-soluble fraction, and this extract was measured for the intrinsic viscosity as the intrinsic viscosity of the EPR of the impact PP used.

Comparative Example 1

A CPP film was formed using only the block PP (a2) and by setting the temperature of the cooling roll in the film formation at 45° C.

The various measurements and the bag drop test were performed in the same manner as in Example 1. The results are shown in Table 1.

In addition, the orange peel resistance of this pouch was evaluated good.

Comparative Example 2

A CPP film was produced in the same manner as in Example 1 except that the weight ratio, the block PP (a2)/the LLDPE (b1), was 80/20 and the temperature of the cooling roll was changed to 45° C., and the various measurements and the bag drop test were performed in the same manner as in Example 1. The results are shown in Table 1.

Comparative Example 3

A CPP film was produced in the same manner as in Example 1 except that the weight ratio, the block PP (a3)/the LLDPE (b1), was 80/20 and the temperature of the cooling roll was changed to 45° C., and the various measurements and the bag drop test were performed in the same manner as in Example 1. The results are shown in Table 1. In this example, the EPR content (xylene-soluble fraction percentage) in the block PP (a3) was low, and thus the maximum point representing the glass transition temperature derived from this EPR was not exhibited.

TABLE 1

|  | EPR content of impact PP used (wt %) | Intrinsic viscosity (dL/g) of EPR of impact PP used | EPR content in CPP (wt %) | Glass transition temperature (Tg) derived from EPR in CPP (° C.) | Tan δ | Pouch drop test Number of times where pouch was unbroken (times) |
|---|---|---|---|---|---|---|
| Example 1 | 17.5 | 2.19 | 14.5 | −16 | 0.073 | 20 |
| Example 2 | 17.5 | 2.19 | 16.1 | −18.8 | 0.075 | 20 |
| Example 3 | 17.5 | 2.19 | 16.6 | −19.0 | 0.072 | 20 |
| Example 4 | 9.4 | 1.78 | 9.9 | −25 | 0.073 | 20 |
| Comparative Example 1 | 7.5 | 1.78 | 7.5 | −34 | 0.058 | 6.3 |
| Comparative Example 2 | 7.5 | 1.78 | 6 | −29 | 0.064 | 11 |
| Comparative Example 3 | 6.4 | 0.56 | 5.1 | N.D. | 0.044 | 2.3 |

The invention claimed is:

1. A propylene-based resin composition comprising:
   an impact polypropylene component (A), and
   a linear low-density polyethylene component (B) containing methylpentene as a comonomer, wherein
   the propylene-based resin composition contains a xylene-soluble fraction in an amount of 8 mass % or higher, and
   an intrinsic viscosity measured for the xylene-soluble fraction is in a range of 1.0 to 2.9 dL/g.

2. The propylene-based resin composition according to claim 1, wherein the xylene-soluble fraction percentage is in a range of 8 to 20 mass %.

3. The propylene-based resin composition according to claim 1, wherein a mass ratio (A)/(B) of the impact polypropylene component (A) to the linear low-density polyethylene component (B) is in a range from 95/5 to 80/20.

4. The propylene-based resin composition according to claim 1, wherein the xylene-soluble fraction is an ethylene-propylene copolymer.

5. A heat sealing film, comprising the propylene-based resin composition described in claim 1.

6. The heat sealing film according to claim 5, wherein a value of tan δ (5° C., 10 Hz) measured by a dynamic viscoelasticity test is in a range of 0.070 or greater, and a glass transition temperature derived from an ethylene-propylene copolymer in the heat sealing film determined from a tan δ-temperature curve obtained by the dynamic viscoelasticity test is higher than −35° C.

7. A multilayer film comprising the heat sealing film described in claim 5, wherein the heat sealing film is a heat-sealing layer.

8. A pouch formed from the multilayer film described in claim 7.

* * * * *